United States Patent Office 3,289,749
Patented Dec. 6, 1966

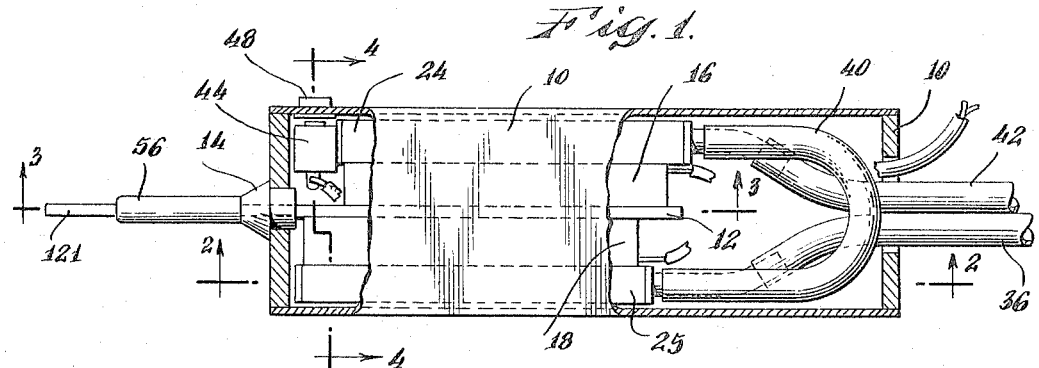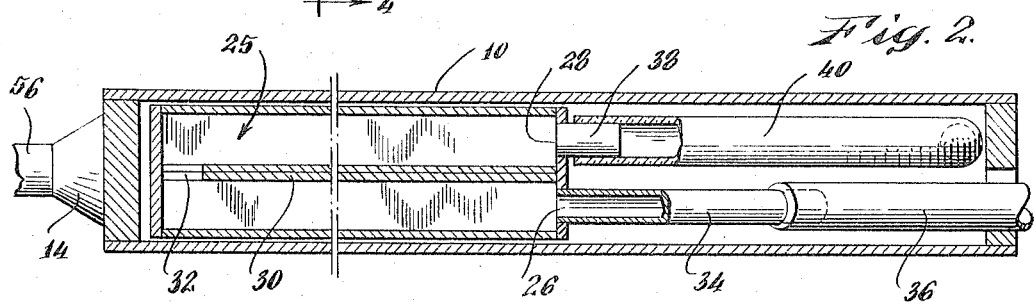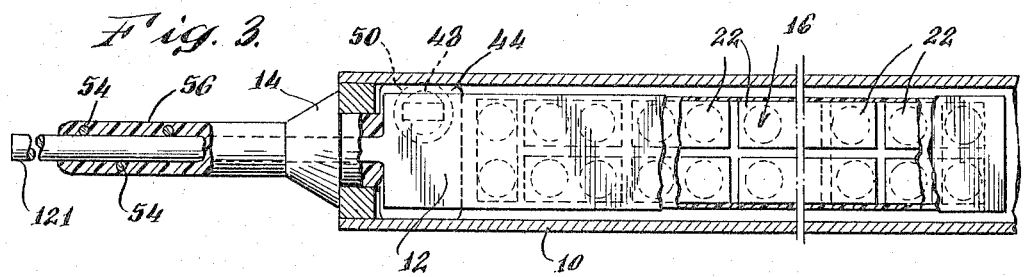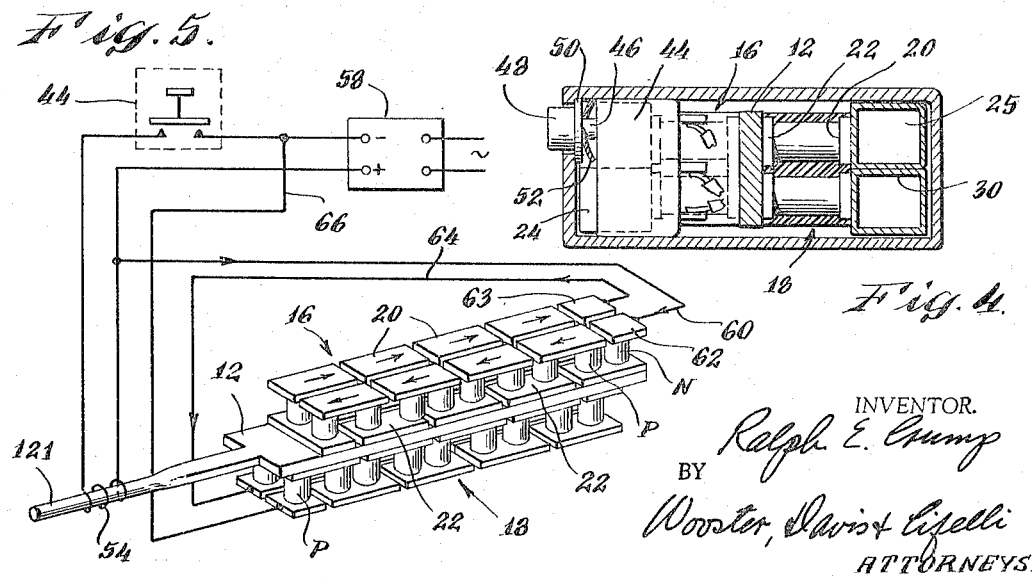

3,289,749
REFRIGERATED MEDICAL APPARATUS AND HEATING MEANS THEREFOR
Ralph E. Crump, Trumbull, Conn., assignor to Frigitronics, Inc., Bridgeport, Conn., a corporation of Connecticut
Filed Mar. 24, 1964, Ser. No. 354,268
9 Claims. (Cl. 165—48)

This invention relates to refrigerated medical apparatus and, more particularly, to such apparatus which is particularly adapted to use in surgery.

One of the most common operations being performed by present day ophthalmic surgeons is the cataract operation. Cataract is particularly prevalent in the elderly and is an opacity of the eye's natural lens. In the cataract operation, the defective lens is removed. This restores the patient's sight although an artificial lens must be used therefater to perform the focusing normally accomplished by the natural lens. The standard procedure for removing the lens is to make a semicircular incision just beyond the outer edge of the cornea, using the outer edge of the iris as a guide. The ligaments holding the lens in place are then broken and the lens carefully tumbled from the eye, using a tweezer-like implement. The corneal incision is then closed with sutures. The lens comprises about 65 percent water and 35 percent organic material within a thin membranous "capsule" which has the approximate tensile properties of the membrane enclosing an egg yolk. For these reasons, the lens is difficult to grasp and is easily broken.

It has been proposed to improve upon this method of lens removal by employing a refrigerated probe. When a refrigerated probe of suitable temperature and thermal conductivity is brought into contact with tissue, an ice ball begins to form in the fluid of the tissue and the tissue adheres to the probe. In this fashion, a greater force may be exerted on the tissue without danger of rupture. it has been discovered that this technique is highly suitable for use in cataract operations. By means of this technique, lenses may be removed with relatively little difficulty as compared to prior surgical methods.

Although the refrigerated probe has shown much promise as a surgical instrument, it has had a number of serious drawbacks. For example, one type of apparatus has utilized a probe cooled by liquid nitrogen expanding at the probe tip. Although equipment of this type will cool a probe sufficiently, it is quite large and expensive. Furthermore, it requires liquid nitrogen, or similar low temperature gases such as Dry Ice, and the temperature of the probe is difficult to control. The latter problem of temperature control is extremely important. This is because a probe which may be, for example, at a temperature of −30° F., will adhere instantly when touched to human tissues. Accordingly, if a surgeon should accidentally touch the wrong part of a member, it might be extremely difficult to remove the probe without causing serious and permanent damage. Also, for some types of surgical procedures, it may be desirable to insert a probe while warm and then cause it to freeze. For example, if the lens should happen to be depressed into the vitreous humor of the eyeball, it may be desired to insert the probe while warm and then cool it to adhere to the lens. It will be understood that all these factors are serious problems with gas cooled probes because of the difficulty in carefully controlling liquid gas flow.

Accordingly, it is the primary object of this invention to provide an improved refrigerated surgical probe. Other objects are to provide such a probe which is lightweight, compact, portable, inexpensive, and which has precise, accurate, and easily controlled temperature characteristics.

The manner in which the foregoing objects are achieved will be more apparent from the following description, the appended claims, and the figures of the attached drawing, wherein;

FIG. 1 is a plan view of a medical instrument constructed in accordance with this invention, partially broken away to show the internal construction thereof;

FIG. 2 is an enlarged cross section taken along the line 2—2 of FIG. 1;

FIG. 3 is an enlarged cross section taken along the line 3—3 of FIG. 1;

FIG. 4 is an enlarged cross section taken along the line 4—4 of FIG. 1; and

FIG. 5 is a partially schematic, partially pictorial illustration showing the electrical circuitry of a medical instrument constructed in accordance with the invention.

The instrument of this invention utilizes the principles of Peltier cooling. When direct electric current is passed through the junction of two different electrical conductors, a temperature difference appears across the junction. This is known as the "Peltier effect." By choosing the correct materials for the two sides of the junction, it is possible to achieve temperature differences of as much as 145° F. Differentials of this magnitude, for example, may be achieved by means of doped bismuth telluride semiconductors. If the hotter half of such a couple is cooled, the temperature of the colder half will be lowered so as to maintain the same temperature differential.

By reference to the figures of the drawing, a surgical probe constructed in accordance with the invention will be seen to comprise a box shaped enclosure 10 which is of a size to conveniently fit the surgeon's hand. Positioned approximately centrally within enclosure 10, is a cold plate 12 which is of generally rectangular configuration but narrows at one end to form an elongated probe 121 which extends outwardly of enclosure 10 through a nylon bushing 14. The material of which the cold plate and probe are constructed should be characterized by high heat capacity and thermal diffusivity. Copper, for example, has been found to give excellent results. Also, the size and shape of the probe may be varied considerably to suit the intended application of the device. In the cataract probe which is illustrated, the rectangular portion of copper cold plate 12 is approximately 35 grams in weight, 3 inches long, .4 inch wide, and .2 inch thick. The probe 121 is approximately 1½ inches in length and is rounded to a cylindrical form of $\frac{1}{16}$ inch diameter at its extremity.

A thermoelectric cooling module 16 is mounted adjacent one face of cold plate 12 and a similar cooling module 18 is mounted adjacent the other face. Each cooling module is formed of a plurality of bismuth-telluride pellets which are doped either P-type or N-type. These pellets are arranged electrically in series and thermally in parallel. This is achieved by arranging the cylindrical pellets alongside one another, alternating N-type and P-type pellets. The ends of the pellets are connected by means of short copper bars which form the junctions between the dissimilar materials. For example, in the partially schematic illustration of FIG. 5, cooling module 16 is illustrated, wherein the pellets P and N are interconnected by means of copper bars 22 which form the cold junctions. Terminal connections are provided by terminal bars 62, 63. Cooling module 18 is formed in exactly the same manner but with the copper bars forming its cooling junctions being positioned uppermost so as to contact the cold plate 12. It will thus be seen that, with this construction, cold plate 12 is cooled simultaneously from both sides at once and the insulation requirements for isolating the cold plate from ambient temperatures are drastically reduced. The cold plate 12, of course, must be electrically insulated from the copper bars 22 to prevent short circuiting of the thermoelectric elements. Any type of electrical insulation which will provide a thermal path is suitable for this purpose. A thin Mylar plastic film is employed in the disclosed apparatus, for example.

For cooling the hot sides of the thermoelectric modules, a small heat exchanger 24 is positioned in thermal contact with the hot junction bars of module 16 and a similar heat exchanger 25 is in thermal contact with the hot junction bars of module 18. The heat exchangers are electrically insulated from the modules by a thin Mylar film. The construction of exchangers 24 and 25 may be seen from an inspection of FIG. 2. Each exchanger is in the form of a substantially rectangular copper tube having an inlet 26 and an outlet 28. Intermediate the inlet and outlet is a central wall 30. The end of wall 30 which is farthest from the inlet and outlet includes an opening 32. An inlet nipple 34 is secured to the inlet 26 for connection to an inlet water tube 36. An outlet nipple 38 is connected to the outlet 28 for connection to a crossover water tube 40. As will be apparent from FIG. 1, crossover tube 40 conducts water from the outlet of heat exchanger 25 to the inlet of heat exchanger 24. The water leaves the apparatus by way of outlet water tube 42.

In assembling the device, the cooling modules 16, 18 are encapsulated with a suitable resin or other plastic to provide mechanical protection and electrical insulation. This may be done while applying compressive force between exchangers 24 and 25 to improve thermal contact.

It will be noted from FIG. 1 that the cooling module 16 and its associated heat exchanger 24 are not directly opposed to the cooling module 18 and its associated heat exchanger 25 relative to the cold plate 12. Module 16 and exchanger 24 are offset rearwardly from the front wall of the enclosure 10 so as to leave room for an electrical switch 44. The actuating button 46 (FIG. 4) of the switch is arranged to be depressed by manually controlled button 48 which extends through an opening in the side of enclosure 10. The button 48 includes a flange 50 which abuts against the inner surface of enclosure 10 and a suitable spring 52 urges the button resiliently outward. The switch 44 is a normally open switch and is closed only upon depression of the button 48. This switch is in series with a small diameter heating wire 54 which is wrapped around a portion of the probe 121. The heating wire is electrically insulated so that its turns are not short circuited by the probe 121. It is suitably wrapped or embedded in a plastic compound 56 which keeps it in place and provides some thermal insulation.

The operation of the instrument of this invention may be best understood by reference to the partially schematic illustration of FIG. 5. An A.-C. to D.-C. rectifier 58, energized from a standard 120 volt A.-C. source, is used to supply the D.-C. voltage required by the cooling modules. The current flows from the positive terminal of the rectifier 58 through conductor 60 into copper terminal bar 62. It then flows downwardly through the first N-type pellet, across the copper bar 22, and upward in the next P-type pellet. Current flow continues in this fashion as shown by the arrows and leaves the upper module via terminal bar 63 and conductor 64. The current flows from conductor 64 into and through the lower module 18 in the same fashion and returns by conductor 66 to the negative terminal of rectifier 58. The D.-C. current flow through the junctions of the dissimilar N and P-type pellets causes a temperature differential to appear between the hot side bars 20 and the cold side bars 22 of cooling module 16 and a similar differential to appear across cooling module 18. As the cold side of each module is thermally connected to the cold plate 12, this plate begins to cool quite rapidly. In order to lower the temperature of cold plate 12 to the desired value, water is passed into the inlet water tube 36, where it travels through the heat exchangers 24 and 25, discharging from outlet water tube 42. This cools the hot side of the cooling modules, thereby lowering the temperature of the cold side by a proportionate amount.

As has been previously explained, the switch 44 is a normally open switch. Accordingly, it will be apparent from FIG. 5 that, when the external button 48 is depressed, the heating wire 54 is energized by being connected directly across the D.-C. terminals of rectifier 58, in parallel with the cooling modules. The size of heating wire 54 is carefully chosen so that it generates heat in an amount just sufficient to raise the temperature at the end of probe 121 above the freezing point and maintain it at such temperature until switch 44 is allowed to open. As soon as this switch is open, residual heat flows immediately from the smaller volume of probe 121 to the lower temperature and higher volume of the heat sink formed by cold plate 12. The temperatures of the probe and cold plate then equalize rapidly.

The temperature control just described serves to provide this invention with many of its unique advantages. Assume, for example, that a surgeon touches the wrong part of the eye while the probe 121 is at a low temperature. By merely pressing the button 48, the probe warms rapidly and will immediately release. Also if the lens happens to be depressed into the vitreous humor, the probe may be inserted while warm. The button 48 is then released and the probe will freeze to the lens within two to three seconds. It will thus be seen that, by means of this arrangement, a surgeon is given a great deal of control over the temperature of the probe which is not available to users of probes utilizing other types of cooling. Furthermore, it will be noted that the circuitry which provides these advantages is extremely simple.

*Example*

As a specific example of an instrument in accordance with this invention, there was constructed a device having the dimensions and configurations described above. Each cooling module employed 16 couples of bismuth-telluride and the modules were energized from a 3.5 volts D.-C. source. The modules together drew 9 amperes.

The auxiliary probe heater comprised 5 inches of .007 inch diameter Teflon covered heating element wrapped along approximately ½ inch of the probe. The heater was energized from the same D.-C. source as the modules and dissipated 5 watts of power. When using a copper probe, this was just sufficient to raise the probe temperature to 40–50° F. Upon releasing the heater control button, the probe tip temperature dropped to well below freezing in 2–3 seconds. Cooling water at 45° F. and a flow rate of .2 gal./min. was satisfactory for this purpose.

It will be obvious to those skilled in the art that a number of variations and modifications may be made in this invention without departing from its spirit and scope. For example, the probe and cold plate may be a fabrication of pieces rather than a single element as described above. The physical size and shape of the device and its probe may be varied widely to suit the particular conditions of use for which it is designed. Also, the auxiliary heater switch may be a normally closed, rather than a normally open, switch. This might have advantages in some applications by permitting the probe to warm in the event the instrument were dropped, or slipped from the surgeon's hand. It will be apparent that the present invention is a small, compact, and low cost unit easily within the financial reach of the practising ophthalmologist and small clinic, as well as larger hospitals. Furthermore, the electrical nature of the invention gives it essentially universal application because suitable power supplies are available widely throughout the world. Actual operative experience with the invention in cataract removal operations has found it to provide a significant advance and improvement over surgical instruments heretofore employed. It will be obvious, of course, that the applications of the present invention are not limited to cataract removal. The device is equally suitable for a great number of other operative procedures, including removal of small skin cancers, rectal polyps, etc. Accordingly, the foregoing description is to be construed as illustrative only, rather than limiting. This invention is limited only by the scope of the following claims.

What I claim as new and desire to secure by Letters Patent of the United States is:

1. A refrigerated medical instrument which comprises: a cooling module including a plurality of alternate hot and cold thermoelectric junctions in electrical series relationship; power supply means connected to pass a direct electrical current through said junctions cooling means arranged to cool the hot junctions of said module; heat sink means of relatively high thermal capacity in thermal contact with the cold junctions of said module and electrically insulated therefrom; heat conducting probe means having a first portion in thermal contact with said sink means and a second portion arranged for application to animal tissue; and means for selectively warming said probe means.

2. The instrument of claim 1 wherein said cooling means is a fluid cooled heat exchanger.

3. The instrument of claim 2 wherein said fluid is water.

4. The instrument of claim 1 wherein said heat sink means has first and second major surfaces and wherein some of said cold junctions are positioned adjacent said first major surface and others of said cold junctions are positioned adjacent said second major surface.

5. The instrument of claim 4 wherein said cooling means comprises a first water cooled heat exchanger in heat transfer relationship with some of said hot junctions and a second water cooled heat exchanger in heat transfer relationship with other of said hot junctions.

6. The instrument of claim 1 wherein said means for warming comprises an electrical heating element and a manually controllable switch in series therewith.

7. The instrument of claim 6 wherein said switch is normally open.

8. A refrigerated medical instrument which comprises: a casing adapted to be held by a user; a heat sink plate positioned within said casing having first and second major surfaces; a first cooling module within said casing including a plurality of alternate hot and cold thermoelectric junctions in electrical series relationship, the cold junctions of said first module being in thermal contact with said first major surface; a second cooling module within said casing including a plurality of alternate hot and cold thermoelectric junctions in electrical series relationship, the cold junctions of said second module being in thermal contact with said second major surface; electrical conductor means connecting said first and second modules in electrical series relationship and extending out of said casing for connections to a D.-C. power supply; a first water cooled heat exchanger within said casing in thermal contact with the hot junctions of said first module and including a water inlet and a water outlet; a second water cooled heat exchanger within said casing in thermal contact with the hot junctions of said second module and including a water inlet and a water outlet; crossover conduit means interconnecting the outlet of said first heat exchanger with the inlet of said second heat exchanger; inlet conduit means connected to the inlet of said first heat exchanger and extending from said casing for connection to an external water supply; outlet conduit means connected to the outlet of said second heat exchanger and extending from said casing for discharging cooling water therefrom; probe means having a first end in thermal contact with said heat sink plate and a second end protruding from said casing, the thermal mass of said probe means being less than the thermal mass of said heat sink plate; electrical resistance heater means in thermal contact with said probe means to warm the second end of said probe means when energized; normally closed switch means in electrical series relationship with said heater means and arranged for actuation to its open position by a user; and electrical conductor means arranged to connect said heater means and switch means across said D.-C. power supply.

9. A refrigerated medical instrument which comprises: heat sink means including an elongated, unitary heat conducting probe having an end arranged for application to animal tissue; cooling means thermally associated with said heat sink means to lower the temperature of said probe end to below 32° F.; and heating means adjacent said end for selectively maintaining said probe means at a temperature higher than 32° F. while maintaining operation of the cooling means without a corresponding increase in temperature of the sink means.

References Cited by the Examiner
UNITED STATES PATENTS

| | | | |
|---|---|---|---|
| 3,093,135 | 6/1963 | Hirschhorn | 62—3 |
| 3,144,078 | 8/1964 | Morton et al. | 62—275 |
| 3,176,472 | 4/1965 | Cox | 62—3 |
| 3,203,290 | 8/1965 | Ashby | 62—3 |

ROBERT A. O'LEARY, *Primary Examiner.*

CHARLES SUKALO, *Examiner.*